US012536730B2

(12) United States Patent
Wong et al.

(10) Patent No.: US 12,536,730 B2
(45) Date of Patent: Jan. 27, 2026

(54) AI FACE DECORATION TEXTURE GENERATION IN SOCIAL MEDIA PLATFORM

(71) Applicant: Lemon Inc., Grand Cayman (KY)

(72) Inventors: Kin Chung Wong, Los Angeles, CA (US); Blake Garrett Fuselier, Los Angeles, CA (US); Jason Yang, Los Angeles, CA (US); Yizhe Zhu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 245 days.

(21) Appl. No.: 18/354,546

(22) Filed: Jul. 18, 2023

(65) Prior Publication Data

US 2024/0404170 A1 Dec. 5, 2024

Related U.S. Application Data

(60) Provisional application No. 63/505,346, filed on May 31, 2023.

(51) Int. Cl.
*G06T 15/04* (2011.01)
*G06F 40/40* (2020.01)
(Continued)

(52) U.S. Cl.
CPC .............. *G06T 15/04* (2013.01); *G06F 40/40* (2020.01); *G06Q 50/01* (2013.01); *G06T 5/77* (2024.01);
(Continued)

(58) Field of Classification Search
CPC .......... G06T 11/001; G06T 11/60; G06T 7/11; G06T 2207/20081; G06T 2207/20084;
(Continued)

(56) References Cited

U.S. PATENT DOCUMENTS

2009/0244071 A1* 10/2009 Kuo ........................ G06T 13/40
704/E21.001
2017/0052937 A1 2/2017 Sirven et al.
(Continued)

FOREIGN PATENT DOCUMENTS

KR 20200092491 A 8/2020

OTHER PUBLICATIONS

ISA Intellectual Property Office of Singapore, International Search Report Issued in Application No. PCT/SG2024/050355, Jul. 16, 2024, WIPO, 4 pages.
(Continued)

*Primary Examiner* — Wesner Sajous
(74) *Attorney, Agent, or Firm* — Alleman Hall & Tuttle LLP

(57) ABSTRACT

A computing system provides a social media platform. The computing system includes one or more processors configured to execute instructions stored in associated memory to receive a base image including a human face and receive an image mask defining a region for inpainting to occur and a region for inpainting to not occur. The region for inpainting to not occur includes at least an eye region. The one or more processors are configured to receive a user text prompt and generate, at an artificial intelligence (AI) model, a face decoration texture using the base image, the image mask, and the user text prompt as input.

20 Claims, 12 Drawing Sheets

(51) Int. Cl.
  *G06Q 50/00* (2012.01)
  *G06T 5/77* (2024.01)
  *G06T 7/90* (2017.01)
  *G06T 11/60* (2006.01)
  *G06T 15/50* (2011.01)
  *G06V 10/56* (2022.01)

(52) U.S. Cl.
  CPC ............... *G06T 7/90* (2017.01); *G06T 11/60* (2013.01); *G06T 15/503* (2013.01); *G06V 10/56* (2022.01); *G06T 2207/10024* (2013.01); *G06T 2207/30201* (2013.01)

(58) Field of Classification Search
  CPC .... G06T 5/60; G06T 5/77; G06T 5/50; G06T 5/90; G06T 2200/24; G06T 19/006; G06T 11/00; G06T 2207/30201; G06T 15/503; G06T 15/04; G06N 7/01; G06N 3/044; G06N 3/045; G06N 3/084; G06N 3/047; G06N 3/088; G06N 3/08; G01L 15/22; G01L 2015/223; G06F 3/167; G06F 3/0481–0488; G06F 16/435; G06F 16/04845; G06F 40/40; G06V 40/171; G06V 40/449; G06V 10/56; G06Q 30/0623; G06Q 30/0643; G06Q 50/01
  See application file for complete search history.

(56) References Cited

U.S. PATENT DOCUMENTS

| | | | |
|---|---|---|---|
| 2018/0075524 A1* | 3/2018 | Sartori Odizzio | .... G06T 11/001 |
| 2020/0042286 A1 | 2/2020 | Bui et al. | |
| 2020/0202579 A1* | 6/2020 | Caballero | ............... G06T 11/00 |
| 2021/0037195 A1* | 2/2021 | Cutler | .................... H04N 5/272 |
| 2021/0124562 A1 | 4/2021 | Kannan et al. | |
| 2022/0202168 A1* | 6/2022 | Troutman | ............. G06T 19/006 |
| 2023/0126177 A1* | 4/2023 | Xu | ............................ G06T 5/60 |
| | | | 382/275 |
| 2023/0148406 A1* | 5/2023 | Ganz | .................... G06F 3/0481 |
| | | | 704/275 |
| 2024/0169622 A1* | 5/2024 | Xie | ........................ G06T 11/00 |

OTHER PUBLICATIONS

ISA Intellectual Property Office of Singapore, International Search Report Issued in Application No. PCT/SG2024/050362, Jul. 5, 2024, WIPO, 4 pages.

Xie, S. et al., "SmartBrush: Text and Shape Guided Object Inpainting with Diffusion Model," Proceedings of the 2023 IEEE/CVF Conference on Computer Vision and Pattern Recognition (CVPR), Jun. 17, 2023, Vancouver, Canada, 10 pages.

United States Patent and Trademark Office, Non-Final Office Action for U.S. Appl. No. 18/448,622, mailed Apr. 22, 2025, 26 pages.

* cited by examiner

AI FACE DECORATION TEXTURE GENERATION IN SOCIAL MEDIA PLATFORM

CROSS REFERENCE TO RELATED APPLICATIONS

This application claims priority to U.S. Provisional Application Ser. No. 63/505,346, filed May 31, 2023, the entirety of which is hereby incorporated herein by reference for all purposes.

BACKGROUND

Many social media platforms provide tools for users to add effects to images and videos before publishing content online. Some of these effects are applied over human faces, such as filters, stickers, and textures designed to make it appear as though objects or materials are present in the images and videos, when they actually are not, or otherwise alter or augment real world objects. These effects are typically provided in a library of effects, and some social media platforms allow users to create new effects themselves. Creation is typically done manually, e.g., in image editing software, and therefore is also typically limited to advanced users. Meanwhile, artificial intelligence (AI) is becoming increasingly widespread as a tool for generating images without a human manually drafting the images from scratch. Attempts to use AI-generated images in the creation of new effects in social media thus far have required further manual adjustment to finalize the effects, limiting the usefulness of AI in this area and preventing laypersons from creating effects.

SUMMARY

A computing system providing a social media platform is provided herein. In one example, the computing system includes one or more processors configured to execute instructions stored in associated memory to receive a base image including a human face and receive an image mask defining a region for inpainting to occur and a region for inpainting to not occur. The region for inpainting to not occur includes at least an eye region. The one or more processors are configured to receive a user text prompt and generate, at an artificial intelligence (AI) model, a face decoration texture using the base image, the image mask, and the user text prompt as input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
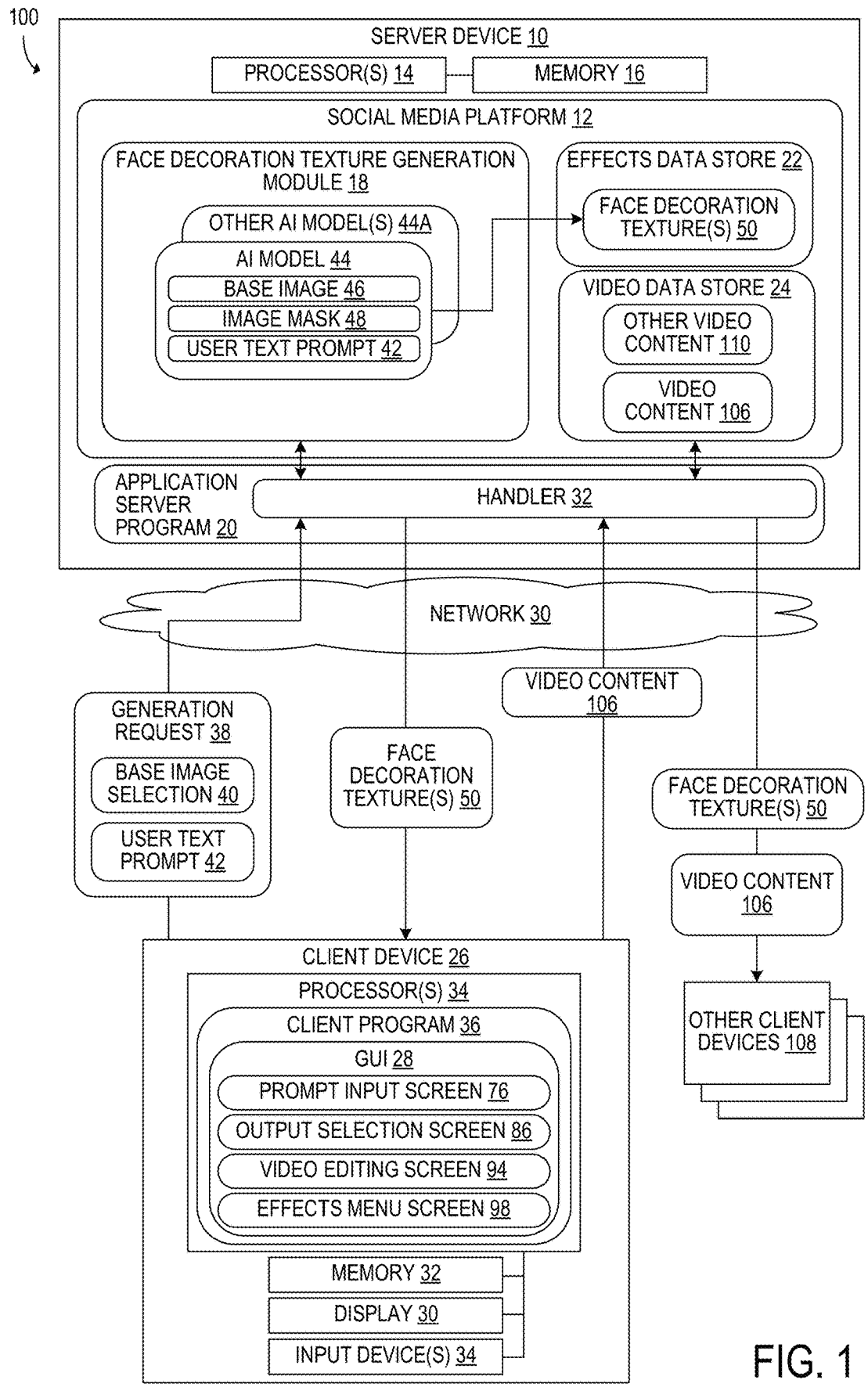
FIG. 1 shows a schematic view of a computing system including a server device providing a social media platform.

To address the issues described above, FIG. 1 illustrates a computing system 100 including a server device 10 providing a social media platform 12. The server device 10 comprises one or more processors 14 configured to execute instructions stored in associated memory 16 to implement various functions of the server device 10. The instructions may include, for example, a face decoration texture generation module 18 and an application server program 20. It will be appreciated that the server device 10 may include multiple different servers working together to provide the social media platform 12, or may be one single server. The server device 10 may further include an effects data store 22 for storing a library of face decoration textures for use by users of the social media platform 12 and a video data store 24 for storing published video content for viewing by the users.

The one or more processors 14 may be configured to send instructions to a client device 26 to cause the client device 26 to display a graphical user interface (GUI) 28 of the social media platform 12. The server device 10 and the client device 24 may be in communication with one another via a network 30 and one or more handler 32 of the application server program 22. The client device 26 may be a smartphone, tablet, personal computer, etc. including one or more processors 34 configured to execute a client program 36 to display the GUI 28 on a display 30, memory 32 for storing instructions, and one or more input devices 34 for receiving user input. The input devices 34 may include, for example, a touch screen, keyboard, microphone, camera, accelerometer, etc. It will be appreciated that the client program 36 may be a dedicated application for accessing the social media platform 12 or may alternatively be a general program such as an internet browser for accessing a content from a variety of server devices including the social media platform 12 from the server device 10. It will be further appreciated that in some implementations, the face decoration texture generation module 18 may be executed locally by the one or more processors 34 the client device 26.

Figure 3A:
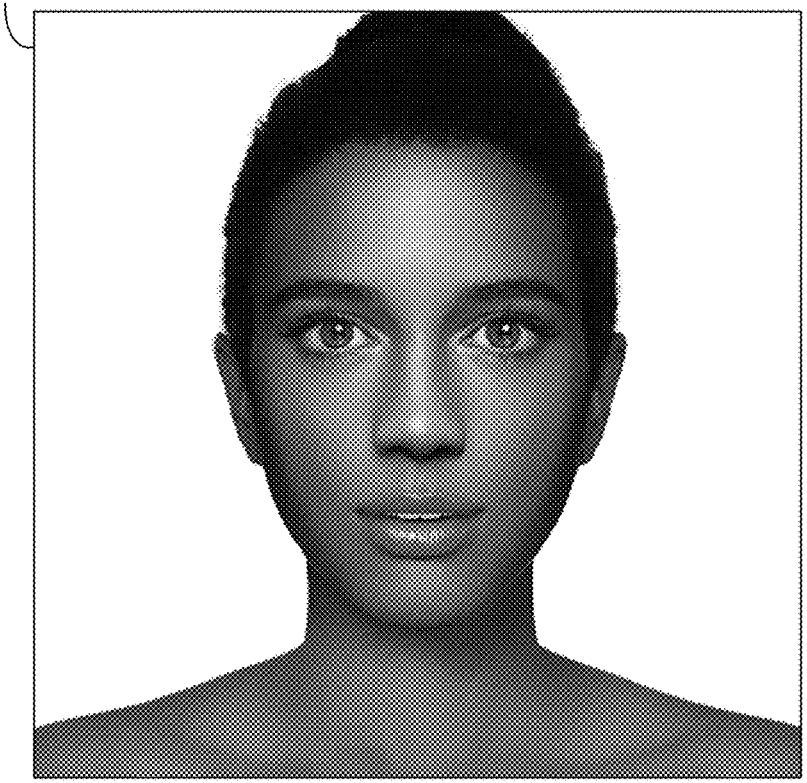
FIGS. 3A-B show example base images used by the computing system of FIG. 1.
Figure 3B:
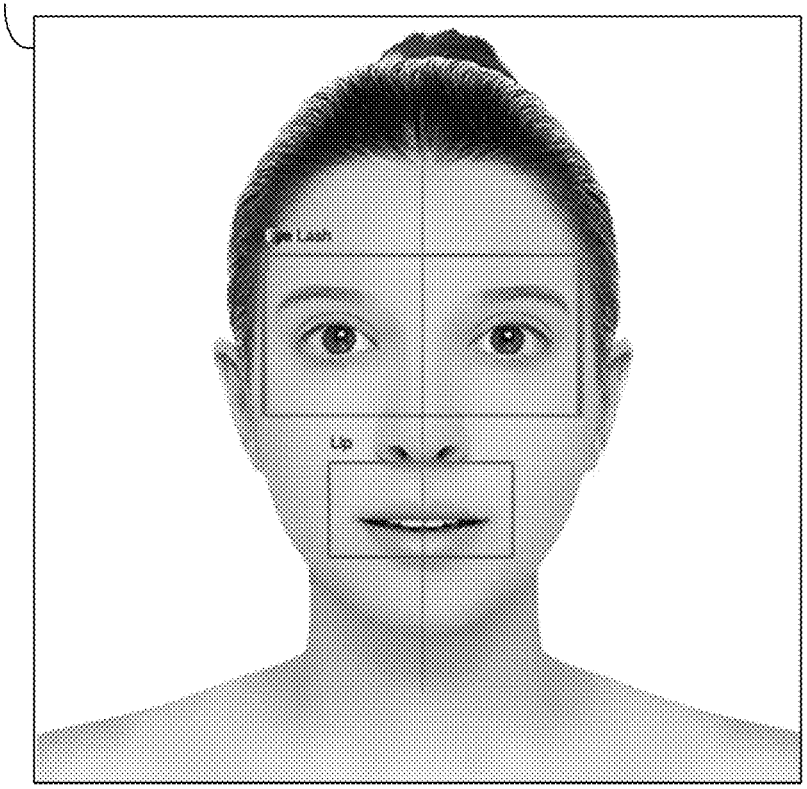

Briefly, the client device 24 may send a generation request 38 to the server device 10 seeking generation of a new effect. The one or more processors 14 may be configured to receive the generation request 38, including a base image selection 40 and a user text prompt 42. Then, an artificial intelligence (AI) model 44 may receive a base image 46 including a human face, an image mask 48 (see examples in FIGS. 4A-D discussed below) defining a region for inpainting to occur and a region for inpainting to not occur, and the user text prompt 42 as input. It will be appreciated that the AI model 44 may be configured to receive the base image 46 from the user of the client device 26, but more simply, the receiving the base image 46 may comprise receiving the selection 40 of one of a plurality of base images 46 (see FIGS. 3A-B for two examples). Alternatively, the AI model 44 may be configured to retrieve a single stored base image 46 from the memory 16. Providing the face decoration texture generation module 18 with a plurality of base images 46 will allow users to test their creations on people with vastly different appearances to ensure that the created effect will be suitable for a wide range of users. In some implementations, the face decoration texture module 18 may include a plurality of models including other AI models 44A, but in other implementations, only the one AI model 44 may be used instead.

The face decoration texture generation module 18 may be configured to generate, at the AI model 44, a face decoration texture 50 using the base image 46, the image mask 48, and the user text prompt 42 as input. As will be discussed in more detail below, the region for inpainting to not occur includes at least an eye region, which helps both the AI model 44 to center the generated face decoration texture 50 at the correct location on the human face in the base image and the face decoration texture generation module 18 to center the generated face decoration texture 50 at the correct location on a person's face in a captured image or video, using at least the eyes as anchor points. Finally, the server device 10 may be configured to store the face decoration texture 50 in the effects data store 22 and/or send the face decoration texture 50 to the client device 26.

Figure 2:
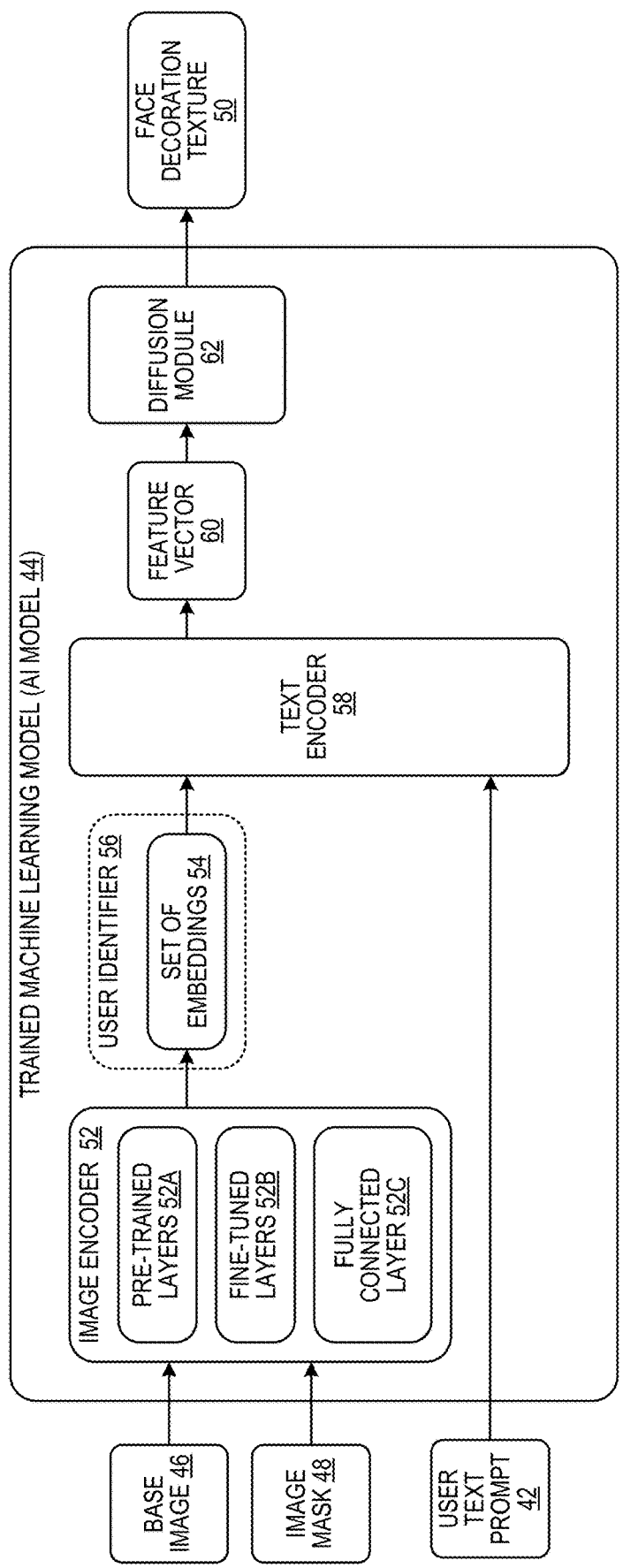
FIG. 2 shows an example artificial intelligence (AI) model used by the computing system of FIG. 1 to generate face decoration textures.

FIG. 2 shows an example of the AI model 44 used by the computing system 100 of FIG. 1 to generate face decoration textures 50. The illustrated AI model 44 is merely an example, and any suitable generative AI model may be used. In the depicted example, the AI model 44 is a trained machine learning model, and is more specifically a diffusion model. Examples of known diffusion models may include STABLE DIFFUSION, Realistic Vision, etc., and suitable diffusion models may include modified versions of these known models. In this example, an image encoder 52 is provided that has pre-trained layers 52A such as a pre-trained contrastive language-image pre-training (CLIP) vision transformer (ViT), fine-tuned layers 52B that are trained to extract visual features from input images such as the base image 46 and the image mask 48, and a fully connected layer 52C configured to generate a set of embeddings 54 based at least on the visual features of the face in the base image 46 extracted by the fine-tuned layers 52B. The image mask 48 may be processed as an alpha channel, indicating which portions of the output should be opaque (included) and which portions should be transparent (excluded). For example, the base image 46 may be first masked based on the blocked out and allowed areas of the image mask 48, and then the resulting masked base image may be used as input for generation as described below. In some implementations, the set of embeddings 54 may be associated with a user identifier 56 of the user of the client device 26.

The AI model 44 may be configured to receive the user text prompt 42 describing what effect the user wants the AI model 44 to create. The user text prompt 42 and the set of embeddings 54 may be provided as input to a text encoder 58 and the text encoder 58 may generate an input feature vector 60 based at least on the user text prompt 42 and the set of embeddings 54. This input feature vector 60 may be sent to a diffusion module 62 of the AI model 44 which is configured to generate a synthesized image as the face decoration texture 50 based at least on the input feature vector 60.

Figure 4A:
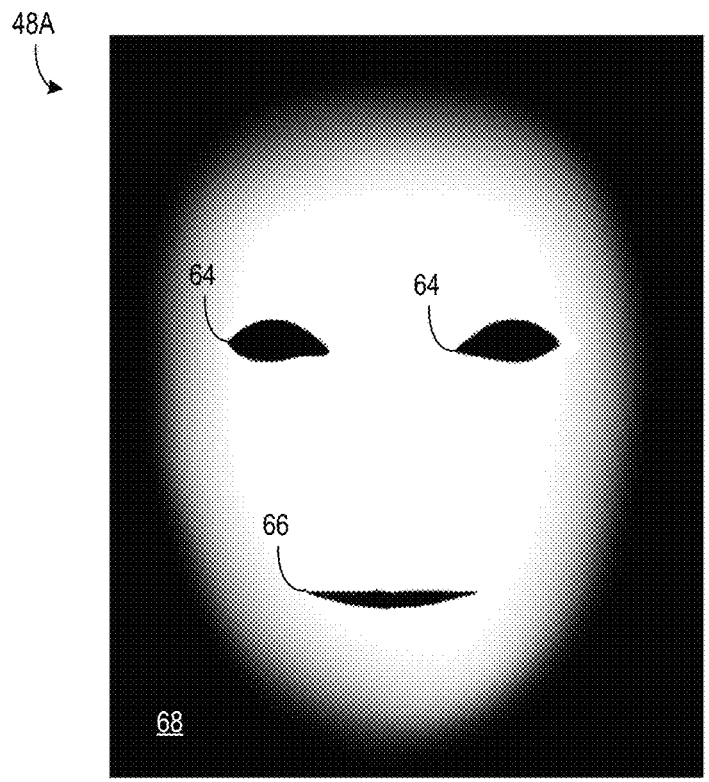
FIGS. 4A-D show example image masks used by the computing system of FIG. 1.
Figure 4B:
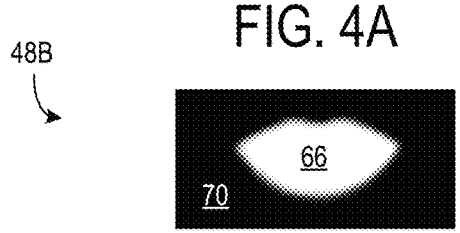

FIGS. 4A-D show examples of the image mask 48 used by the computing system 100 of FIG. 1. In FIG. 4A, the face decoration texture 50 to be generated is a mask and a first image mask 48A includes a region for inpainting to occur (white) and a region for inpainting to not occur (black). Here, the region for inpainting to not occur further includes, in addition to an eye region 64 (specifically, two eye regions 64), a mouth region 66. The general shape is a face mask such as for a Halloween costume, and therefore the region for inpainting to occur is limited to this face mask shape and a region 68 surrounding the face is not included. Using the first image mask 48A may output a full face mask as the face decoration texture 50, with the mouth and eyes cut out so that the eyes and mouth of the person in the image are visible. In some implementations, the face decoration texture 50 may be makeup, as is the case when using example image masks 48B-D shown in FIGS. 4B-D. A second image mask 48B in FIG. 4B includes the mouth region 66 which is included in the region for inpainting to occur (white), while the region for inpainting to not occur (black) further includes a region 70 around the mouth region 66. Notably, this is the opposite of the first image mask 48, where the mouth region 66 is included in the region for inpainting to not occur (black). This is because a face mask typically shows the wearer's mouth, whereas makeup commonly includes lipstick or lip gloss on the wearer's mouth. Thus, the second image mask 48 may be lip-shaped and exclude the region 70 around the lips from the region for inpainting to occur.

Figure 4C:
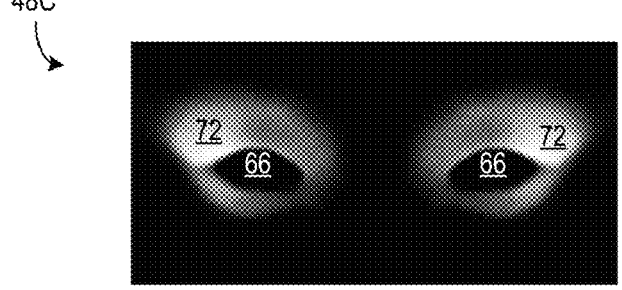
Figure 4D:
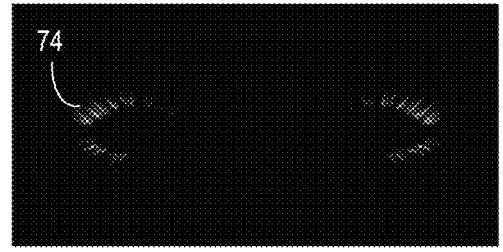

FIGS. 4C-D both include a region 72 around the eye region 64 in the region for inpainting to occur. For example, a third image mask 48C in FIG. 4 has the region for inpainting to occur (white) unevenly encircling the eye region 64 to provide a palette for mainly eyeshadow above the wearer's eye and additional under-eye makeup more thinly surrounding the underside of the eye region 64. It will be appreciated that different shapes of the region 72 around the eye region 64 may be used, such as one larger region surrounding both eye regions 66. A fourth image mask 48D in FIG. 4D, meanwhile, provides only an eyelash region 74 radiating outward from and surrounding the eye region 64 as the region for inpainting to occur (white), and the rest of the image mask is black. The image mask 48 used by the AI model 44 may be chosen appropriately based on the intended output of the face decoration texture generation module 18, that is, whether the user is requesting to generate a mask or makeup. The social media platform 12 may offer both features through separate pathways, may determine which is requested based on context of the user text prompt, or may offer only one or the other exclusively. Furthermore, face decoration textures other than makeup and masks may be generated. For the makeup, any suitable combination of image masks 48B-D may be used as the image mask 48 to be input to the AI model 44. For example, a user requesting "sparkly pink lipgloss" may in some instances receive a generated face decoration texture 50 covering just the mouth region 66, and a user requesting "full glam blue makeup" may receive a face decoration texture 50 covering both the mouth region 66 and the region 72 surrounding the eye region 64.

Figure 5:
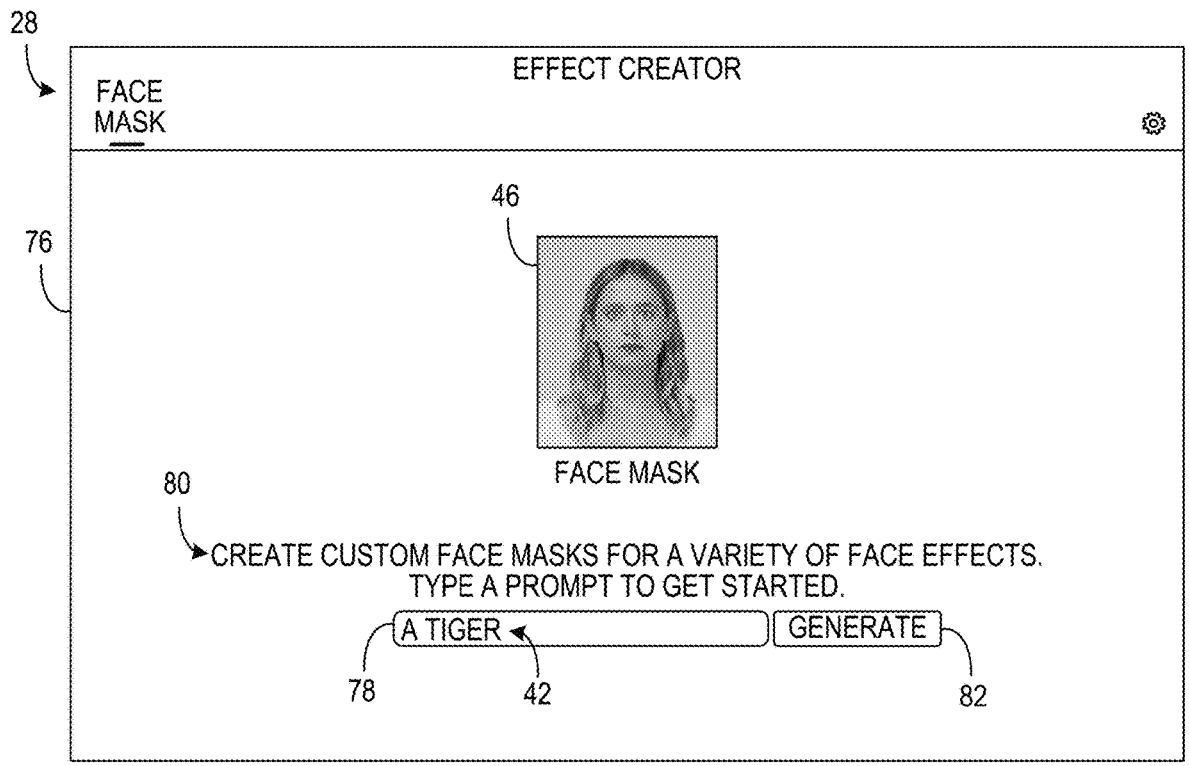
FIG. 5 shows an example graphical user interface (GUI) of the social media platform of FIG. 1, displaying a prompt input screen.
Figure 6:
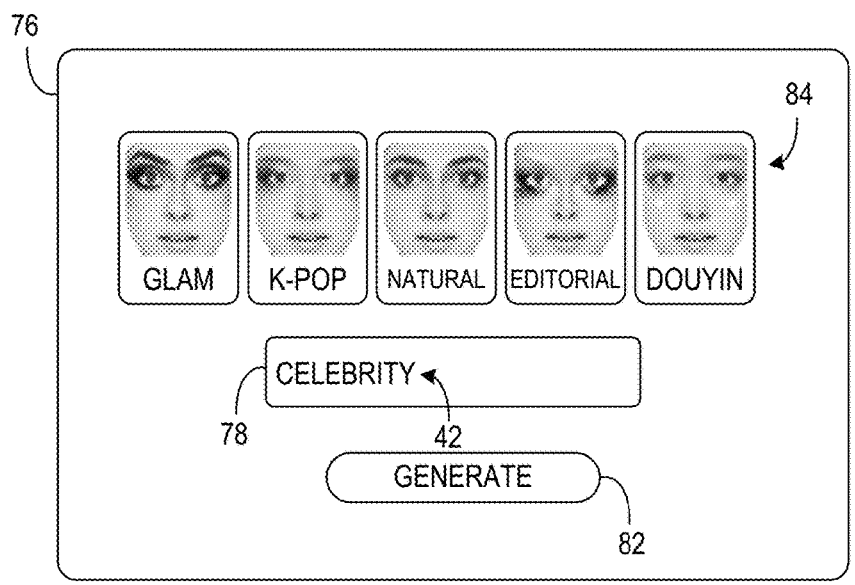
FIG. 6 shows another example prompt input screen of the GUI of FIG. 5.

FIGS. 5A-12 show various example screens and videos (or still images) displayed by the GUI 28 in relation to the generation of the face decoration texture 50. In FIGS. 5-6, the GUI 28 is displaying a prompt input screen 76. The example shown in FIG. 5 may be tailored to a desktop version of the client program 36, while the example shown in FIG. 6 may be tailored to a mobile version. The desktop version may be directed toward more skilled users who are given more options and control over effect creation, whereas the mobile version may be streamlined to produce effects for users with less experience. In FIG. 5, the GUI 28 may display a prompt input box 78 configured to receive the user text prompt 42. An instruction 80 may explain how to use the face decoration effect generation feature. The base image 46 selected by the user may be displayed for reference. A generate selector 82 may be selectable in order to send the input to the AI model 44 to begin generation. In contrast, in FIG. 6, the one or more processors 14, 34 may be configured to present the GUI 28 to a user of the client device 26, which may be a mobile computing device in this case. Here, the GUI 28 may eventually be configured to display the face decoration texture 50 on a human face (see, e.g., FIGS. 8B-C) but not display the base image 46. In both versions, the GUI 28 may not display the image mask 48 to the user. By reducing display of the extra inputs that the user will not be familiar with, the process can be streamlined and the GUI 28 can be made less confusing to the user. In addition, the mobile version may include one or more suggested prompts 84, which may be accompanied by images or video of corresponding face decoration textures. Selection of one of the suggested prompts 84 by the user may result in the suggested prompt 84 being added to the prompt input box 78 for the user, who may be free to modify or add to the suggested prompt 84 before finalizing the user text prompt 42.

Figure 7:
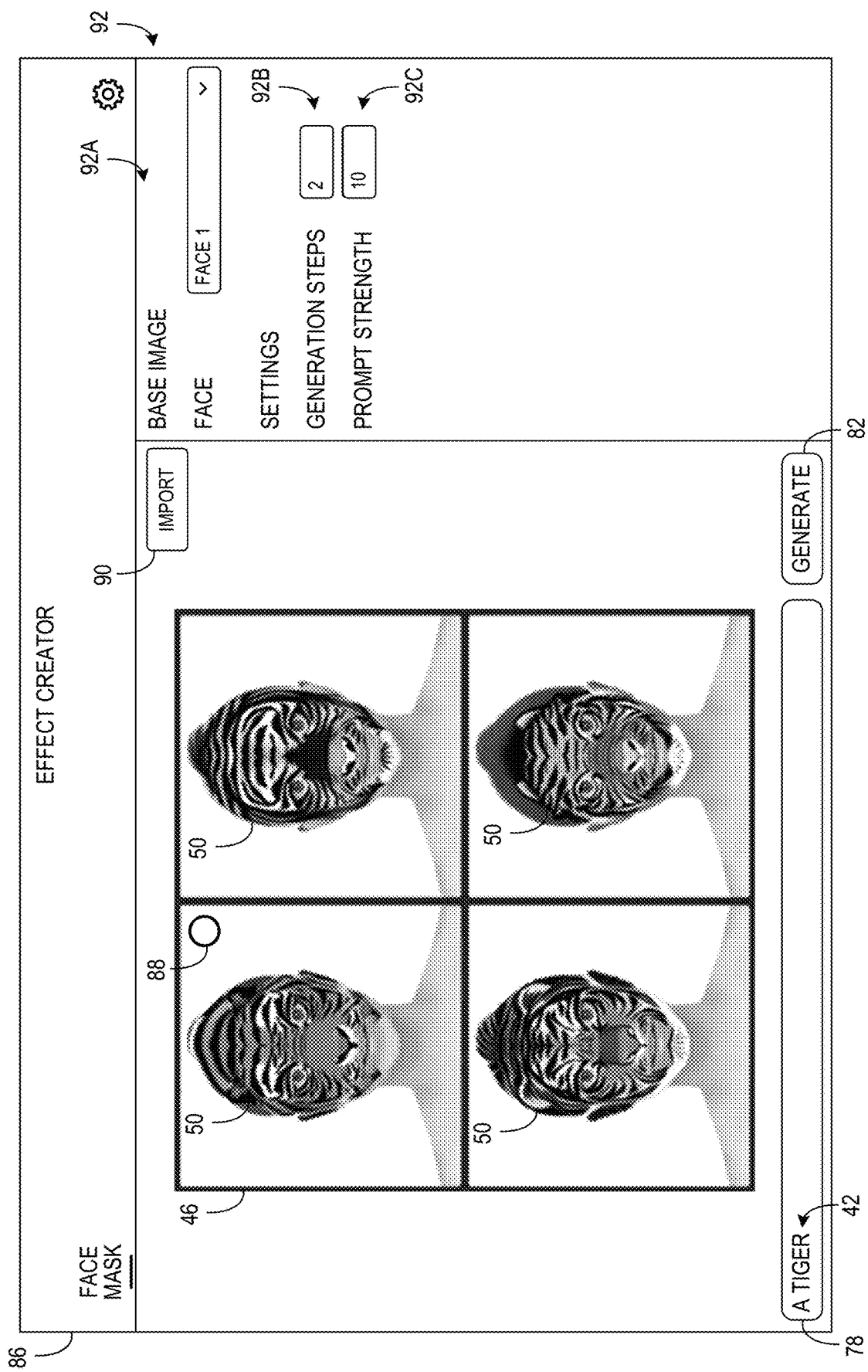
FIG. 7 shows an example output selection screen of the GUI of FIG. 5.

FIG. 7 shows an example output selection screen 86 of the GUI 28 of FIG. 5. Here, the output of the AI model 44 includes a plurality of the face decoration textures 50, four in the example shown here. The GUI 28 may include a respective check selector 88 for selecting any of the face decoration textures 50 that the user wishes to keep. Each check selector 88 may be hidden until the user's cursor hovers over the respective face decoration texture 50, for example. An import selector 90 may be operable to download any selected face decoration textures 50 to the client device 26 or all of the face decoration textures 50 if none are selected. To the right of the face decoration textures 50 is an options pane 92. A base image menu 92A may be included to allow the user to select which base image is displayed under the face decoration texture 50. This may allow the user to test if the generated face decoration texture 50 is suitable for various face types, particularly various skin tones. The options pane 92 may further include customizable options for the AI model 44 such as generation steps 92B, which is the number of diffusion steps taken by the AI model 44, and prompt strength 92C, which is how strongly the AI model weights the user text prompt 42 during generation. Once the user is satisfied with the face decoration texture 50 and downloads one or more to the client device 26, then the user can use the face decoration texture 50 in video and image editing.

Figure 8C:
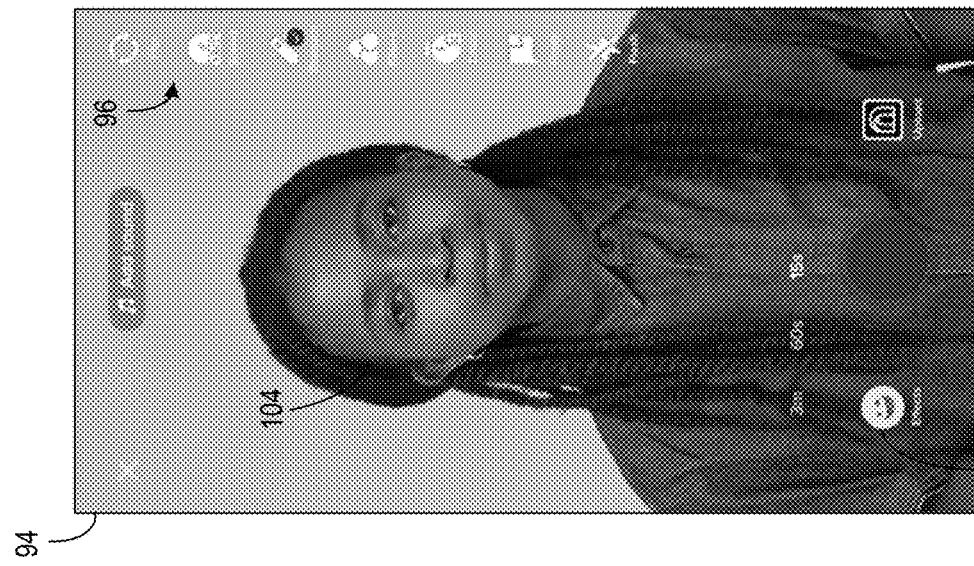
FIGS. 8B-C show an example video being edited in the video editing screen of FIG. 8A, where an "old lady" face decoration texture is applied to a woman's face.
Figure 8B:
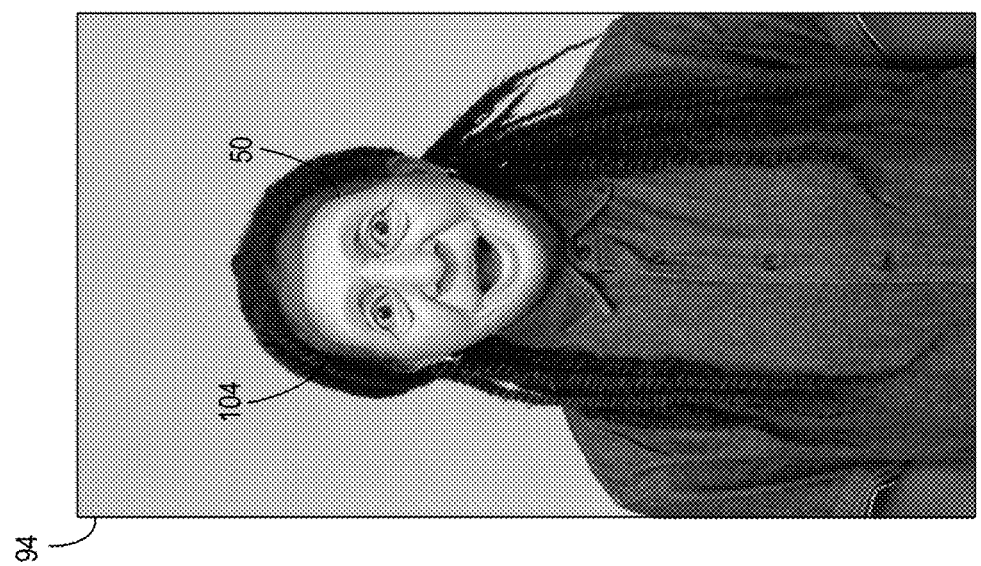
Figure 8A:
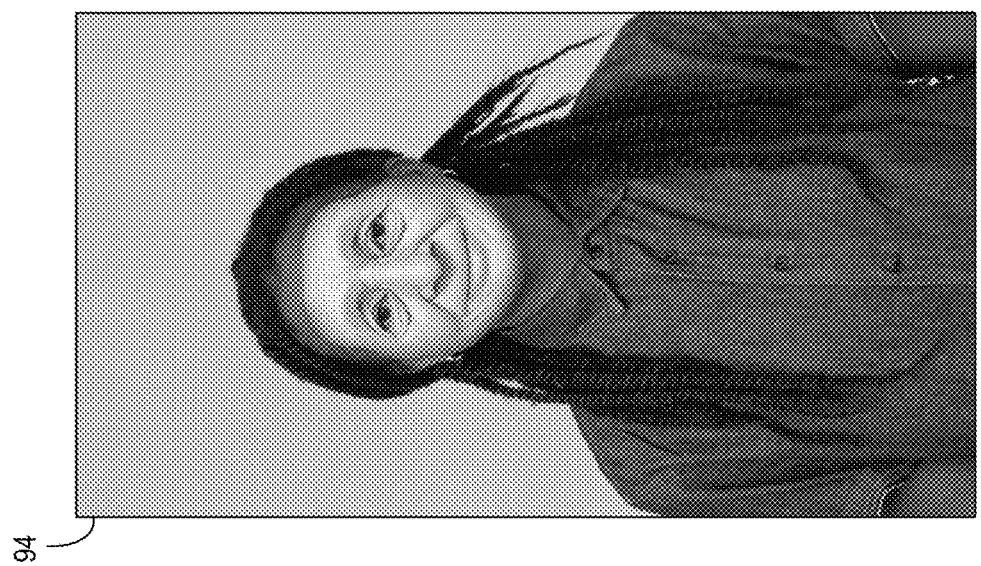
FIG. 8A shows an example video editing screen of the GUI of FIG. 5.

FIG. 8A shows an example video editing screen 94 of the GUI 28 of FIG. 5. Several icons 96 arranged around the video editing screen 94 may be operable to perform various editing tasks in order to produce a final video. The icons 96 are shown only in FIG. 8A for simplicity. In this example, a woman is shown in the video. Once the face decoration texture 50 is created, the one or more processors 14, 34 may be further configured to automatically apply the face decoration texture 50 to a video captured by a camera of the client device 26, or may be selectable from a menu such as an effects menu screen 98 (see FIG. 12) openable via an effects selector 102. It will be appreciated that the video may be a "viewfinder" live preview of the scene capturable by the camera before recording, live footage currently being recorded by the camera, or previously recorded and stored footage. For example, FIGS. 8B-C show a face decoration texture 50 generated from the user text prompt "old lady" applied over a human face 104 in a live video feed. Typically, three-dimensional effects such as this are applied as textures over a mesh, where the mesh tracks the human face as it moves in each frame. The human face 104 in the live video feed is detected using a face detection algorithm (e.g., to find eyes and mouth), and a three-dimensional face model (mesh) is generated from the detected human face 104 using a three-dimensional reconstruction algorithm. The face decoration texture 50 is applied to the three-dimensional face model. The position and orientation of the three-dimensional model and the face decoration texture 50 applied thereto is updated based on changes in position and orientation of the detected human face 104 in each frame of the live video feed.

In some implementations, the face decoration texture generation module 18 may even be able to adjust the mesh to create three-dimensional features, e.g. a tiger with a muzzle projecting from the wearer's face rather than a human nose with tiger stripes. This may be accomplished through depth estimation by an algorithm and corresponding adjustments to the image mask 48, for example. Whether the mesh is original or altered, in this manner, the user can try out the face decoration texture 50 in real time with a range of poses, postures, and facial expressions, and begin filming with the effect, despite only creating the face decoration texture 50 moments before. Once the video is finalized, the user may publish video content 106 on the social media platform 12 for viewing by other users on other client devices 108. The other users may view the video content 106 as well as other video content 110 stored in the video data store 24 of the server device 10.

Figure 9A:
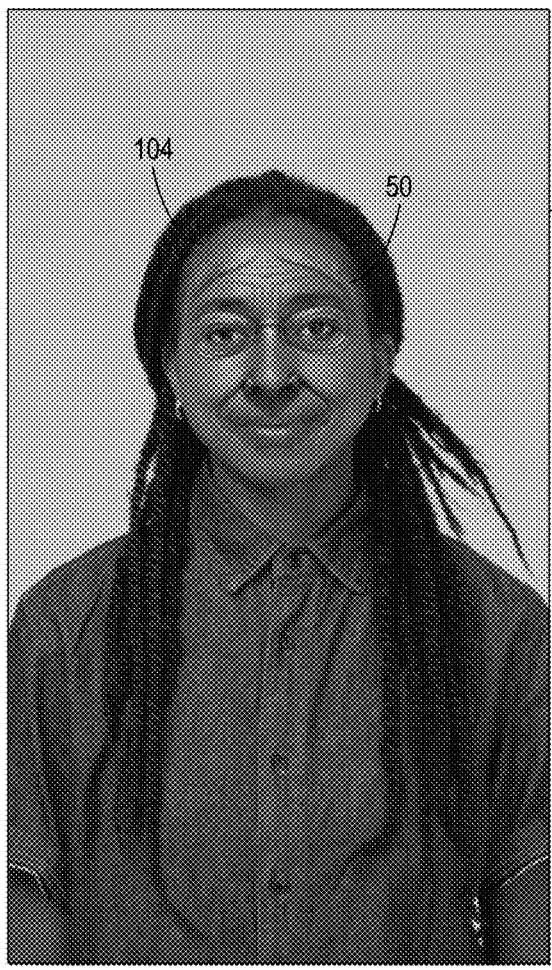
FIGS. 9A-B show an example video being edited in the video editing screen of FIG. 8A, where the "old lady" face decoration texture is applied to the woman's face with blending for skin tone matching.
Figure 9B:
Figure 10:
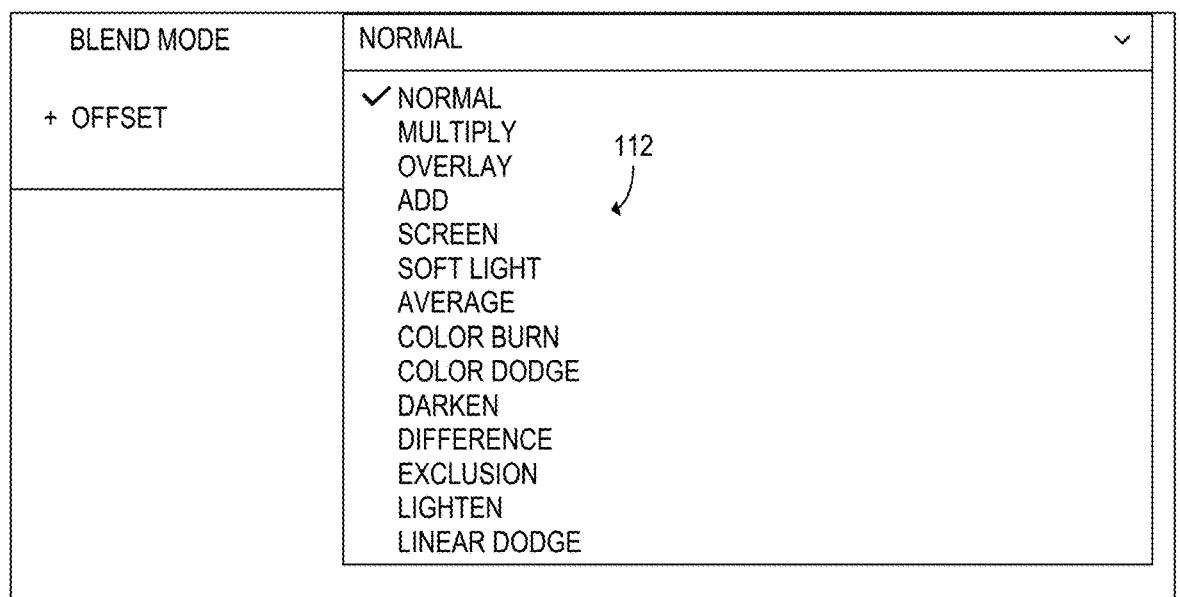
FIG. 10 shows an example blending menu of the GUI of FIG. 5.

However, the face decoration texture 50 shown in FIGS. 8B-C has a noticeably different skin tone than the woman to which it is applied. This may turn off users from utilizing the face texture generation function if they feel like the face decoration texture 50 is not made with them in mind. Accordingly, the one or more processors 14, 34 may be further configured to, on a pixel-by-pixel basis, determine a skin tone hue of the human face 104 at a pixel, then compare a hue of a corresponding pixel of the face decoration texture 50 to be overlaid on the human face 104. If a difference between the hue of the face decoration texture 50 and the skin tone hue is less than or equal to a threshold value, then the one or more processors 14, 34 may return the pixel of the face decoration texture 50 as-is. However, if the difference is greater than the threshold value, then the one or more processors 14, 34 may multiply the hue of the face decoration texture 50 and the skin tone hue and return a resulting value as the pixel of the face decoration texture 50. FIGS. 9A-B show the same woman with a slightly different "old lady" face decoration texture 50 that has been appropriately blended to match her skin tone. Thus, even if the base image is of a human with a vastly different skin tone than the human to which the generated face decoration texture 50 is applied, the skin tone can be blended and the user can be provided with tone-matched effect. Furthermore, the blending process is based on the skin tone hue and not another value such as brightness, and therefore warmer tones may blend more while cooler tones may blend less. Thus, blue eye shadow, for example, will blend just enough to not appear as unnatural ink on top of the human face while also not appearing to soak into the skin of the human face. In addition, as shown in FIG. 10, the one or more processors 14, 34 may be further configured to present the user of the client device 26 with a plurality of blend modes 112 for blending of the face decoration texture 50 with the human face 104. The blend modes 112 are shown here in an example blending menu 114, and it will be appreciated that they are merely examples and other suitable blend modes may be included.

Figure 11C:
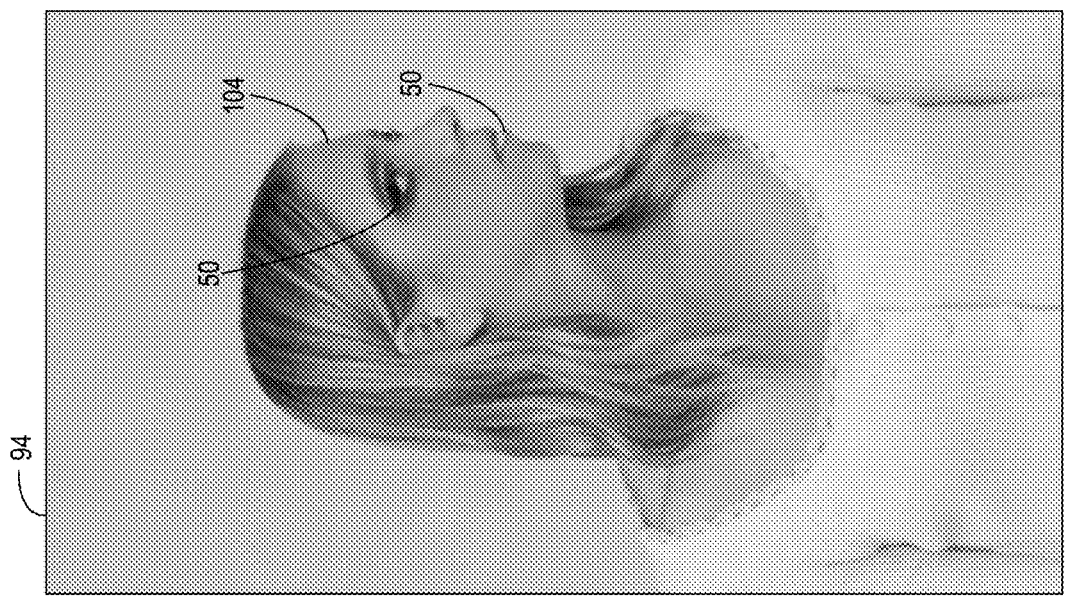
FIGS. 11A-C show another example video being edited in the video editing screen of FIG. 8A, where a makeup face decoration texture is applied to a woman's face.
Figure 11B:
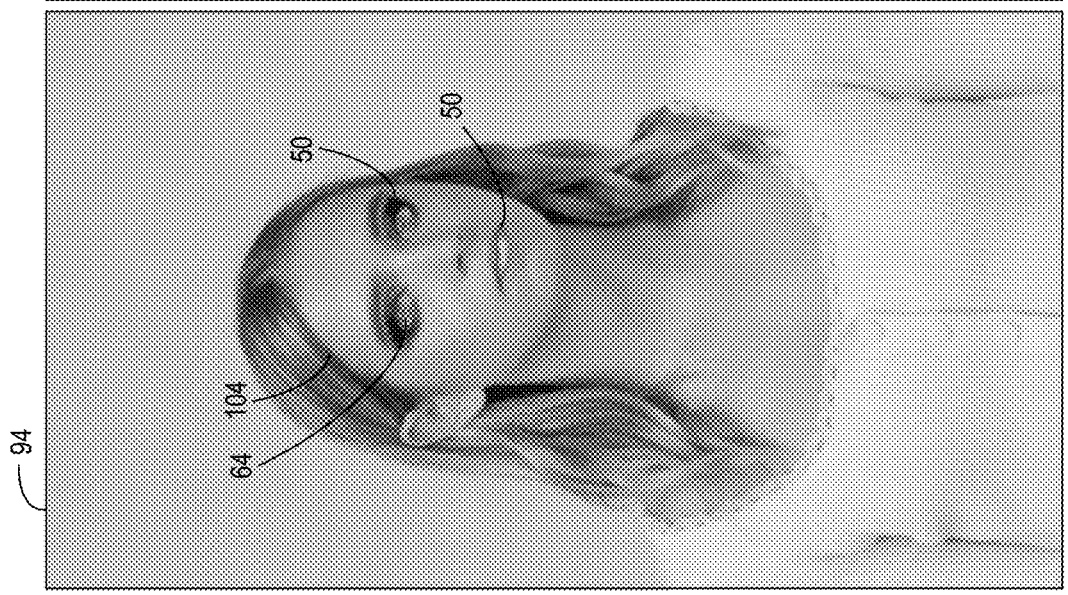
Figure 11A:
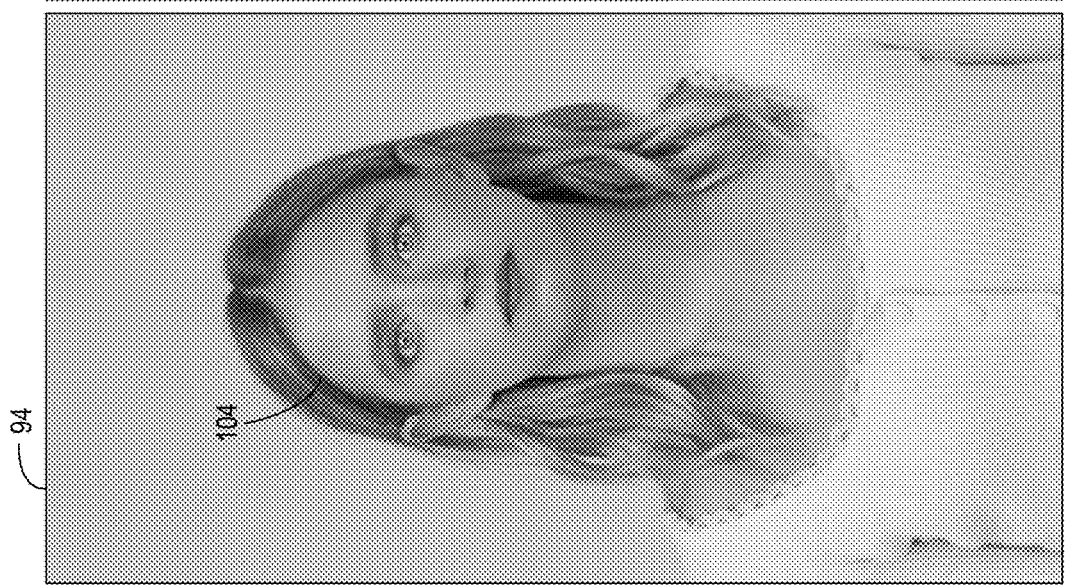

FIGS. 11A-C show another example video being edited in the video editing screen 94 of FIG. 8A, where a makeup face decoration texture is applied to a woman's face. FIG. 11A shows a video containing another human face 104 of a different woman than the one in FIG. 8A, without an effect being applied. In FIGS. 11B-C, the face decoration texture 50 is applied over the human face 104, specifically, to a mesh which is constantly updated to track the human face 104 throughout the video. In this example, the face decoration texture 50 includes eye makeup and lip makeup, but the area around the lips and the around outside of the area immediately surrounding the eyes, as well as the eye region 64 itself (e.g., the visible portion of the eyeball inside of the eyelids), are excluded from the applied effect. As can be seen from FIGS. 11B-C, even when the woman in the video turns her head, the makeup effect is precisely placed due to the AI model 44 accurately placing the effect around the eyes and mouth of the base image 46, by using the image mask 48 for guidance. Thus, accurate placement of the generated face decoration texture 50 is possible without manual human intervention during or after generation.

Figure 12:
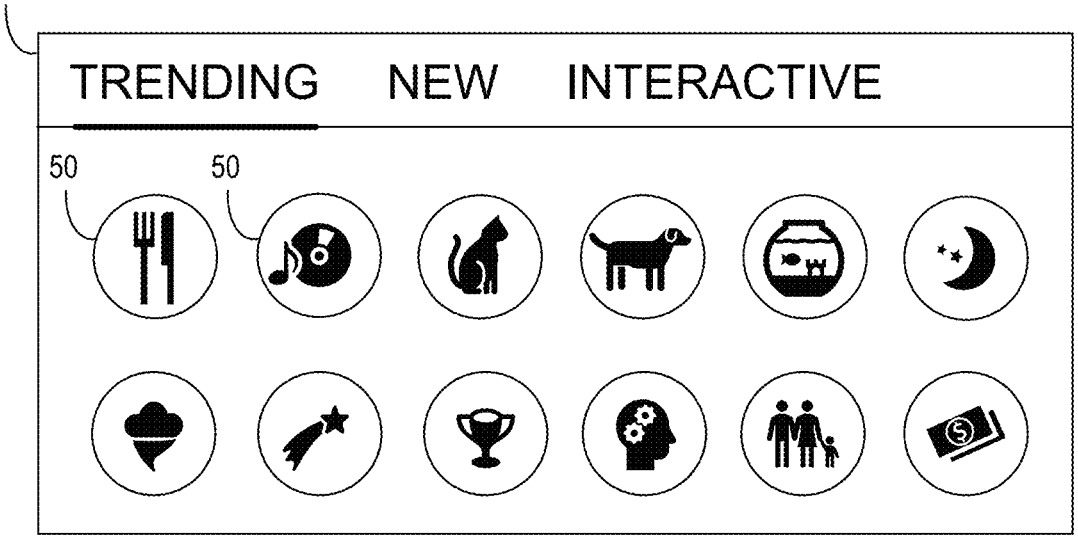
FIG. 12 shows an example effects menu listing trending effects, in the GUI of FIG. 5.

In some instances, the one or more processors 14, 34 may be further configured to store the face decoration texture 50 and make the face decoration texture 50 available to other users of the social media platform 12 via other client devices 108. The face decoration texture 50 may be available by different avenues such as an effects library of the effects data store 22, which may be accessible via the effects menu screen 98 opened by the effects selector 102 shown in FIG. 8A, for example. In some cases, the one or more processors 14, 34 may be further configured to present to the other users a plurality of trending face decoration textures 50 including the face decoration texture 50. FIG. 12 shows an example of the effects menu screen 98 listing trending effects, in the GUI 28 of FIG. 5. The trending face decoration textures 50 may be those that are engaged with (viewed, liked, applied, published, edited, etc.) by the other users of the social media platform 12, as determined according to an algorithm. By allowing users to share and use user-created effects, the user base of the social media platform 12 may have an enhanced user experience with increased options, including more options that are inclusive of users of various ethnicities and face types, and therefore user engagement may also increase.

Figure 13:
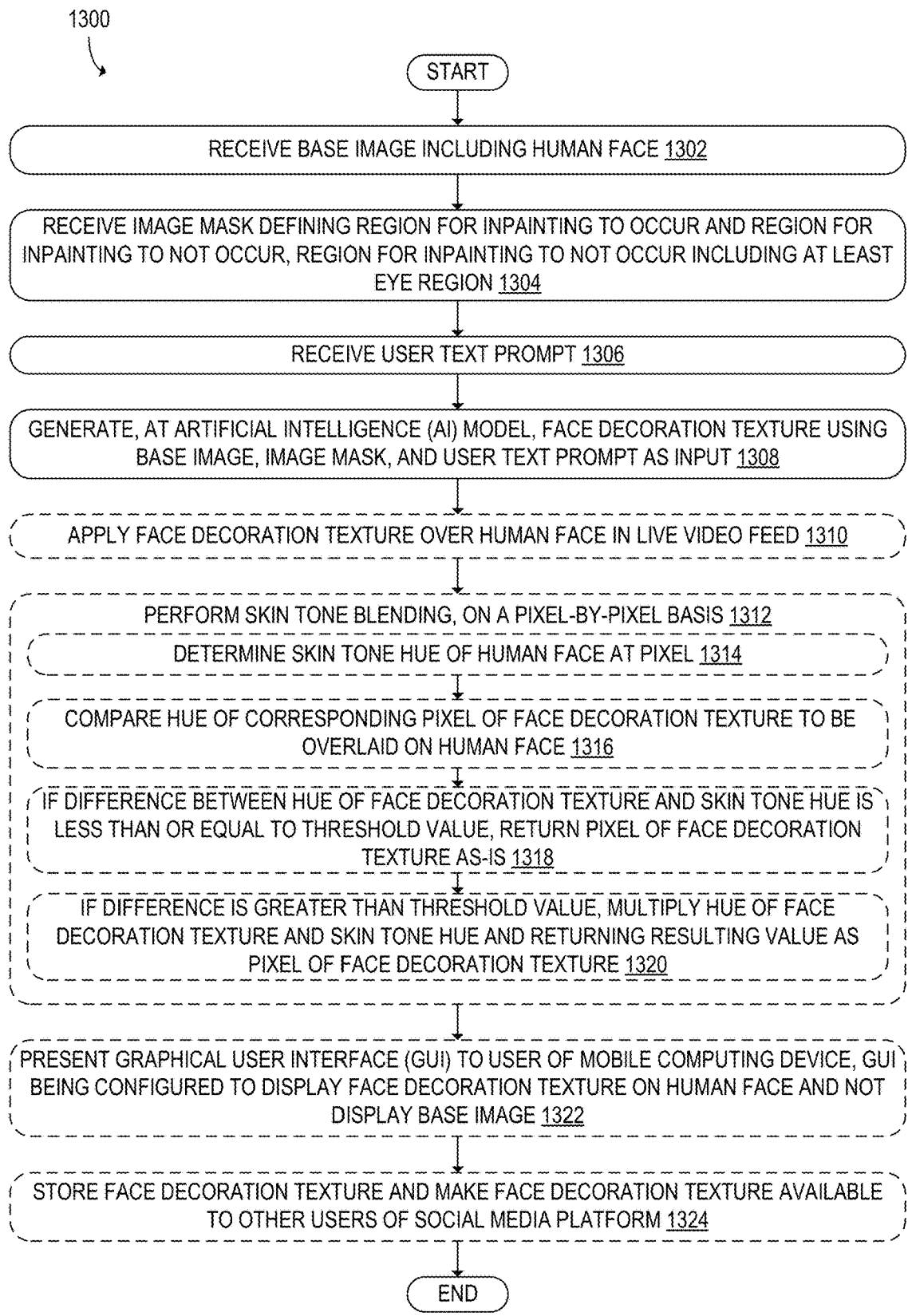
FIG. 13 shows a flowchart of a method for a social media platform.

FIG. 13 shows a flowchart for a method 1300 for a social media platform according to the present disclosure. The method 1300 may be implemented by the computing system 100 illustrated in FIG. 1. At 1302, the method 1300 may include receiving a base image including a human face. At 1304, the method 1300 may include receiving an image mask defining a region for inpainting to occur and a region for inpainting to not occur, the region for inpainting to not occur including at least an eye region. At 1306, the method 1300 may include receiving a user text prompt. At 1308, the method 1300 may include generating, at an artificial intelligence (AI) model, a face decoration texture using the base image, the image mask, and the user text prompt as input. In this manner, a custom face decoration texture can be generated by even users with no skill in graphic design on the fly, and the generated texture will be easily applied with precision due to the use of the image mask detailing the regions for inpainting to occur or not occur. At 1310, the method 1300 may include applying the face decoration texture over a human face in a live video feed. Thus, once created, the face decoration texture may be usable by the user or other users immediately in a live video feed with constantly updating frames and the face decoration texture may stay located on the human face with high accuracy.

In some implementations, the AI model may be a diffusion model. A diffusion model may be suitable for generating desired effects. At 1312, the method 1300 may include performing skin tone blending, by performing the following sub-steps on a pixel-by-pixel basis: at 1314, determining a skin tone hue of the human face at a pixel; at 1316, comparing a hue of a corresponding pixel of the face decoration texture to be overlaid on the human face; at 1318, if a difference between the hue of the face decoration texture and the skin tone hue is less than or equal to a threshold value, returning the pixel of the face decoration texture as-is; and at 1320, if the difference is greater than the threshold value, multiplying the hue of the face decoration texture and the skin tone hue and returning a resulting value as the pixel of the face decoration texture. In this manner, even if the base image has pale skin and the human face to which the face decoration texture is to be applied has substantially darker skin, the hue of the face decoration texture can be adjusted so that the skin tone blends naturally into the captured image of the human face.

In some implementations, the face decoration texture may be a mask and the region for inpainting to not occur may further include a mouth region. Thus, the generated face decoration texture may accurately track the eyes and mouth of the human face, and properly show these features through the face decoration texture. In other implementations, the face decoration texture may be makeup, the region for inpainting to occur may include a mouth region and a region around the eye region, and the region for inpainting to not occur may further include a region around the mouth region. As opposed to the mask implementation which should not cover the mouth of the human face, makeup often includes a lip component and therefore should cover the mouth of the human face but not bleed outside of the mouth. Thus, the generated face decoration texture may accurately track the eyes and mouth of the human face, and properly show these features through the face decoration texture, even when the mouth region is included rather than excluded as in the mask implementation.

In some implementations, the receiving the base image may comprise receiving a selection of one of a plurality of base images. For example, a desktop version of a client program may provide the user with more customization features and options and may allow the user to select from various base images when requesting generation of the face decoration texture. Alternatively, at 1322, the method 1300 may include presenting a graphical user interface (GUI) to a user of a mobile computing device, the GUI being configured to display the face decoration texture on the human face and not display the base image. Thus, in a more streamlined approach, the AI model may automatically receive the base image along with the image mask from storage to be used as input without the user needing to provide further input to select or provide these images. At 1324, the method 1300 may include storing the face decoration texture and making the face decoration texture available to other users of the social media platform. In this manner, the user may be able to share their creation with other users, enhancing the user experience across the social media platform.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
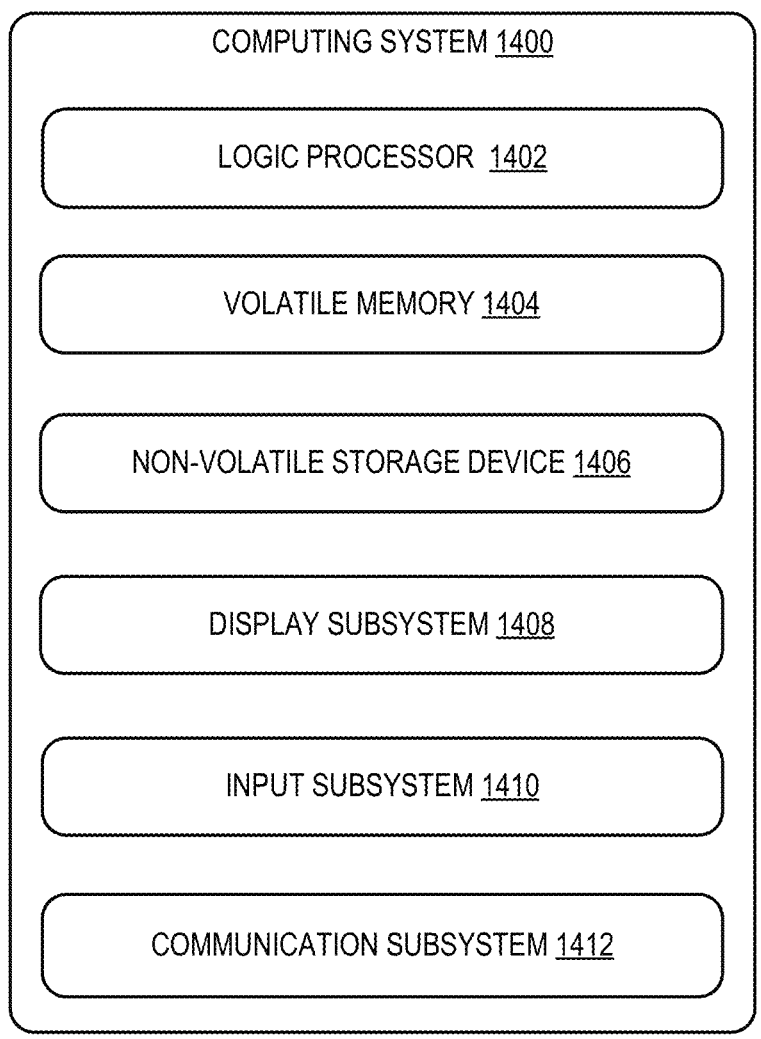
FIG. 14 shows a schematic view of an example computing environment in which the computing system of FIG. 1 may be enacted.

FIG. 14 schematically shows a non-limiting embodiment of a computing system 1400 that can enact one or more of the methods and processes described above. Computing system 1400 is shown in simplified form. Computing system 1400 may embody the computer device 10 described above and illustrated in FIG. 2. Computing system 1400 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 1400 includes a logic processor 1402 volatile memory 1404, and a non-volatile storage device 1406. Computing system 1400 may optionally include a display subsystem 1408, input subsystem 1410, communication subsystem 1412, and/or other components not shown in FIG. 14.

Logic processor 1402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1406 includes one or more physical devices configured to hold instructions executable by the logic processors to implement the methods and processes described herein. When such methods and processes are implemented, the state of non-volatile storage device 1406 may be transformed—e.g., to hold different data.

Non-volatile storage device 1406 may include physical devices that are removable and/or built-in. Non-volatile storage device 1406 may include optical memory (e.g., CD, DVD, HD-DVD, BLU-RAY DISC, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1406 may include nonvolatile, dynamic, static, read/write, read-only, sequential-access, location-addressable, file-addressable, and/or content-addressable devices. It will be appreciated that non-volatile storage device 1406 is configured to hold instructions even when power is cut to the non-volatile storage device 1406.

Volatile memory 1404 may include physical devices that include random access memory. Volatile memory 1404 is typically utilized by logic processor 1402 to temporarily store information during processing of software instructions. It will be appreciated that volatile memory 1404 typically does not continue to store instructions when power is cut to the volatile memory 1404.

Aspects of logic processor 1402, volatile memory 1404, and non-volatile storage device 1406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1400 typically implemented in software by a processor to perform a particular function using portions of volatile memory, which function involves transformative processing that specially configures the processor to perform the function. Thus, a module, program, or engine may be instantiated via logic processor 1402 executing instructions held by non-volatile storage device 1406, using portions of volatile memory 1404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1408 may be used to present a visual representation of data held by non-volatile storage device 1406. The visual representation may take the form of a graphical user interface (GUI). As the herein described methods and processes change the data held by the non-volatile storage device, and thus transform the state of the non-volatile storage device, the state of display subsystem 1408 may likewise be transformed to visually represent changes in the underlying data. Display subsystem 1408 may include one or more display devices utilizing virtually any type of technology. Such display devices may be combined with logic processor 1402, volatile memory 1404, and/or non-volatile storage device 1406 in a shared enclosure, or such display devices may be peripheral display devices.

When included, input subsystem 1410 may comprise or interface with one or more user-input devices such as a keyboard, mouse, touch screen, game controller, microphone, camera, accelerometer, gyroscope, and/or any other suitable sensor. When included, communication subsystem 1412 may be configured to communicatively couple various computing devices described herein with each other, and with other devices. Communication subsystem 1412 may include wired and/or wireless communication devices compatible with one or more different communication protocols. As non-limiting examples, the communication subsystem may be configured for communication via a wireless telephone network, or a wired or wireless local- or wide-area network, such as an HDMI over wireless network connection. In some embodiments, the communication subsystem may allow computing system 1400 to send and/or receive messages to and/or from other devices via a network such as the Internet.

The following paragraphs provide additional description of the subject matter of the present disclosure. One aspect provides a computing system providing a social media platform. The computing system comprises one or more processors configured to execute instructions stored in associated memory to receive a base image including a human face, receive an image mask defining a region for inpainting to occur and a region for inpainting to not occur, the region for inpainting to not occur including at least an eye region, receive a user text prompt, and generate, at an artificial intelligence (AI) model, a face decoration texture using the base image, the image mask, and the user text prompt as input. In this aspect, additionally or alternatively, the AI model is a diffusion model. In this aspect, additionally or alternatively, the face decoration texture is a mask and the region for inpainting to not occur further includes a mouth region. In this aspect, additionally or alternatively, the face decoration texture is makeup, the region for inpainting to occur includes a mouth region and a region around the eye region, and the region for inpainting to not occur further includes a region around the mouth region. In this aspect, additionally or alternatively, the receiving the base image comprises receiving a selection of one of a plurality of base images. In this aspect, additionally or alternatively, the one or more processors are further configured to apply the face decoration texture over a human face in a live video feed. In this aspect, additionally or alternatively, the one or more processors are further configured to, on a pixel-by-pixel basis, determine a skin tone hue of the human face at a pixel, compare a hue of a corresponding pixel of the face decoration texture to be overlaid on the human face, if a difference between the hue of the face decoration texture and the skin tone hue is less than or equal to a threshold value, return the pixel of the face decoration texture as-is, and if the difference is greater than the threshold value, multiply the hue of the face decoration texture and the skin tone hue and return a resulting value as the pixel of the face decoration texture. In this aspect, additionally or alternatively, the one or more processors are further configured to present a user of a client device with a plurality of blend modes for blending of the face decoration texture with the human face. In this aspect, additionally or alternatively, the one or more processors are further configured to present a graphical user interface (GUI) to a user of a mobile computing device, the GUI being configured to display the face decoration texture on the human face and not display the base image. In this aspect, additionally or alternatively, the one or more processors are further configured to store the face decoration texture and make the face decoration texture available to other users of the social media platform.

Another aspect provides a method for a social media platform. The method comprises receiving a base image including a human face, receiving an image mask defining a region for inpainting to occur and a region for inpainting to not occur, the region for inpainting to not occur including at least an eye region, receiving a user text prompt, and generating, at an artificial intelligence (AI) model, a face decoration texture using the base image, the image mask, and the user text prompt as input. In this aspect, additionally or alternatively, the AI model is a diffusion model. In this aspect, additionally or alternatively, the face decoration texture is a mask and the region for inpainting to not occur further includes a mouth region. In this aspect, additionally or alternatively, the face decoration texture is makeup, the region for inpainting to occur includes a mouth region and a region around the eye region, and the region for inpainting to not occur further includes a region around the mouth region. In this aspect, additionally or alternatively, the receiving the base image comprises receiving a selection of one of a plurality of base images. In this aspect, additionally or alternatively, the method further comprises applying the face decoration texture over a human face in a live video feed. In this aspect, additionally or alternatively, the method further comprises, on a pixel-by-pixel basis: determining a skin tone hue of the human face at a pixel, comparing a hue of a corresponding pixel of the face decoration texture to be overlaid on the human face, if a difference between the hue of the face decoration texture and the skin tone hue is less than or equal to a threshold value, returning the pixel of the face decoration texture as-is, and if the difference is greater than the threshold value, multiplying the hue of the face decoration texture and the skin tone hue and returning a resulting value as the pixel of the face decoration texture. In this aspect, additionally or alternatively, the method further comprises storing the face decoration texture and making the face decoration texture available to other users of the social media platform. In this aspect, additionally or alternatively, a non-transitory computer-readable storage medium stores a computer program which, when executed by a processor, causes the processor to perform the method.

Another aspect provides a server device providing a social media platform. The server device comprises one or more processors configured to execute instructions stored in associated memory to receive a selection of a base image including a human face, receive a user text prompt, and generate, at an artificial intelligence (AI) model, a face decoration texture using the base image, an image mask, and the user text prompt as input, the image mask defining a region for inpainting to occur and a region for inpainting to not occur, the region for inpainting to not occur including at least an eye region.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system providing a social media platform, the computing system comprising:
  one or more processors configured to execute instructions stored in associated memory to:
    receive a base image including a human face;
    receive an image mask defining a region for inpainting to occur and a region for inpainting to not occur, the region for inpainting to not occur including at least an eye region;
    receive a user text prompt;
    generate, at an artificial intelligence (AI) model, a face decoration texture using the base image, the image mask, and the user text prompt as input; and
    on a pixel-by-pixel basis:
      determine a skin tone hue of a human face at a pixel;
      compare a hue of a corresponding pixel of the face decoration texture to be overlaid on the human face;
      if a difference between the hue of the face decoration texture and the skin tone hue is less than or equal to a threshold value, return the pixel of the face decoration texture as-is; and
      if the difference is greater than the threshold value, multiply the hue of the face decoration texture and the skin tone hue and return a resulting value as the pixel of the face decoration texture.

2. The computing system of claim 1, wherein the AI model is a diffusion model.

3. The computing system of claim 1, wherein the face decoration texture is a mask and the region for inpainting to not occur further includes a mouth region.

4. The computing system of claim 1, wherein
  the face decoration texture is makeup,
  the region for inpainting to occur includes a mouth region and a region around the eye region, and
  the region for inpainting to not occur further includes a region around the mouth region.

5. The computing system of claim 1, wherein the receiving the base image comprises receiving a selection of one of a plurality of base images.

6. The computing system of claim 1, wherein the one or more processors are further configured to apply the face decoration texture over the human face in a live video feed.

7. The computing system of claim 1, wherein the one or more processors are further configured to present a user of a client device with a plurality of blend modes for blending of the face decoration texture with the human face.

8. The computing system of claim 1, wherein the one or more processors are further configured to present a graphical user interface (GUI) to a user of a mobile computing device, the GUI being configured to display the face decoration texture on the human face and not display the base image.

9. The computing system of claim 1, wherein the one or more processors are further configured to store the face decoration texture and make the face decoration texture available to other users of the social media platform.

10. A method for a computing system providing a social media platform, the method comprising, at one or more processors of the computing system:
  receiving a base image including a human face;
  receiving an image mask defining a region for inpainting to occur and a region for inpainting to not occur, the region for inpainting to not occur including at least an eye region;
  receiving a user text prompt;
  generating, at an artificial intelligence (AI) model, a face decoration texture using the base image, the image mask, and the user text prompt as input; and
  on a pixel-by-pixel basis:
    determining a skin tone hue of a human face at a pixel;
    comparing a hue of a corresponding pixel of the face decoration texture to be overlaid on the human face;
    if a difference between the hue of the face decoration texture and the skin tone hue is less than or equal to a threshold value, returning the pixel of the face decoration texture as-is; and
    if the difference is greater than the threshold value, multiplying the hue of the face decoration texture and the skin tone hue and returning a resulting value as the pixel of the face decoration texture.

11. The method of claim 10, wherein the AI model is a diffusion model.

12. The method of claim 10, wherein the face decoration texture is a mask and the region for inpainting to not occur further includes a mouth region.

13. The method of claim 10, wherein
  the face decoration texture is makeup,
  the region for inpainting to occur includes a mouth region and a region around the eye region, and
  the region for inpainting to not occur further includes a region around the mouth region.

14. The method of claim 10, wherein the receiving the base image comprises receiving a selection of one of a plurality of base images.

15. The method of claim 10, further comprising applying the face decoration texture over the human face in a live video feed.

16. The method of claim 10, further comprising storing the face decoration texture and making the face decoration texture available to other users of the social media platform.

17. A non-transitory computer-readable storage medium storing a computer program which, when executed by the one or more processors, causes the one or more processors to perform the method of claim 10.

18. A server device providing a social media platform, the server device comprising:
  one or more processors configured to execute instructions stored in associated memory to:
    receive a selection of a base image including a human face;
    receive a user text prompt;
    generate, at an artificial intelligence (AI) model, a face decoration texture using the base image, an image mask, and the user text prompt as input, the image mask defining a region for inpainting to occur and a region for inpainting to not occur, the region for inpainting to not occur including at least an eye region; and
    on a pixel-by-pixel basis:
      determine a skin tone hue of a human face at a pixel;
      compare a hue of a corresponding pixel of the face decoration texture to be overlaid on the human face;

if a difference between the hue of the face decoration texture and the skin tone hue is less than or equal to a threshold value, return the pixel of the face decoration texture as-is; and if the difference is greater than the threshold value, multiply the hue of the face decoration texture and the skin tone hue and return a resulting value as the pixel of the face decoration texture.

19. The server device of claim 18, wherein the face decoration texture is a mask and the region for inpainting to not occur further includes a mouth region.

20. The server device of claim 18, wherein the receiving the base image comprises receiving a selection of one of a plurality of base images.

* * * * *